G. W. PUGH.
WIRE CONNECTOR.
APPLICATION FILED OCT. 24, 1921.
1,417,408.
Patented May 23, 1922.
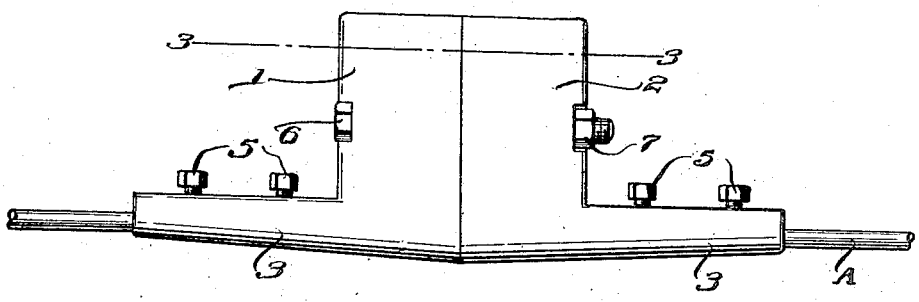
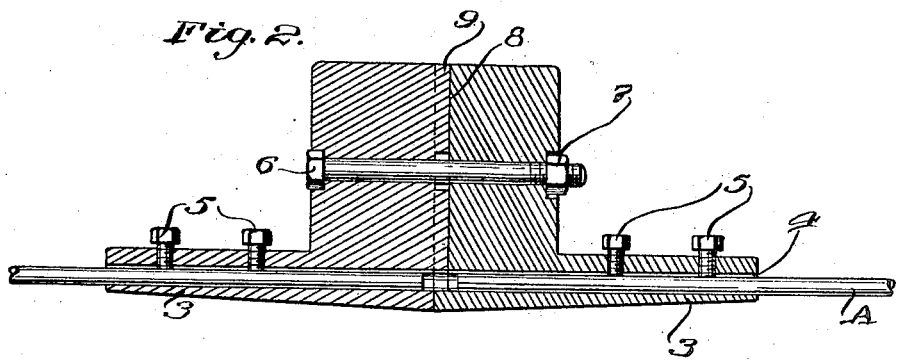
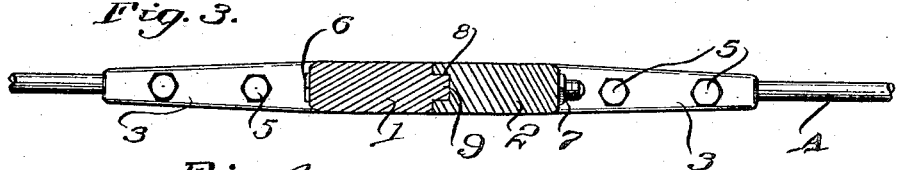
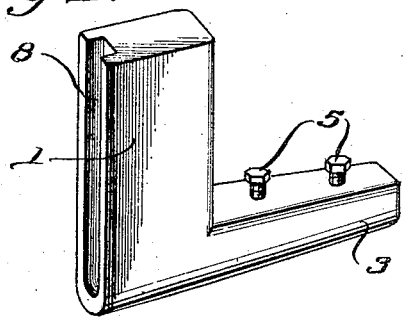
George W. Pugh.
INVENTOR
BY Victor J. Evans
ATTORNEY
WITNESS:

UNITED STATES PATENT OFFICE.

GEORGE W. PUGH, OF LEONA MINES, VIRGINIA.

WIRE CONNECTOR.

1,417,408. Specification of Letters Patent. Patented May 23, 1922.

Application filed October 24, 1921. Serial No. 510,173.

*To all whom it may concern:*

Be it known that I, GEORGE W. PUGH, a citizen of the United States, residing at Leona Mines, in the county of Lee and State of Virginia, have invented new and useful Improvements in Wire Connectors, of which the following is a specification.

This invention relates to a wire connector for connecting two pieces of wire together and while the invention is mainly designed for connecting together trolley wires it will be understood that it may be used for connecting other kinds of wires.

An object of the invention is to provide a pair of members to which the ends of the wires are connected with means for drawing the two members together.

Another object of the invention is to provide interlocking tongues and grooves on the two members for holding them against lateral or turning movement.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the invention.

Figure 2 is a like view with parts in section.

Figures 3 and 4 are detail views.

As shown in these views the device consists of a pair of members 1 and 2, each member having an extension 3 at its bottom which is provided with a bore 4 for receiving the end of the wire A, this wire being held in place by the set screws 5. The body parts of the two members are to be connected together by the bolt 6 and the nut 7 and one member is provided with a groove 8 for receiving the tongues 9 on the other member. Thus when the two members are drawn together by the bolt and nut the tongues will engage the recesses so as to lock the two members together and thus prevent turning or lateral movement of one member in relation to the other. The lower edges of the members and of the extensions are rounded, as shown, so as to facilitate the passage of the trolley wheel from one section of the wire to the next. The bores 4 are made of the same cross sectional shape as the wire, the ends of which are to be connected.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a pair of members having extensions at the lower ends, means for connecting the end of a wire to each extension and means for connecting the bodies of the two members together.

2. A device of the class described comprising a pair of members having extensions at the lower ends, means for connecting the end of a wire to each extension and means for connecting the bodies of the two members together, such means consisting of a bolt passing through the two bodies and a nut engaging the bolt.

3. A device of the class described comprising a pair of members, each having an extension at its lower end having a bore therein for receiving a part of the wire, means for holding the wire in the bore, interlocking tongues and grooves on the members and a bolt passing through the two members for holding them together.

In testimony whereof I affix my signature.

GEORGE W. PUGH.